United States Patent
Maguire, Jr.

(10) Patent No.: US 7,108,378 B1
(45) Date of Patent: Sep. 19, 2006

(54) METHOD AND DEVICES FOR DISPLAYING IMAGES FOR VIEWING WITH VARYING ACCOMMODATION

(76) Inventor: Francis J. Maguire, Jr., 88 Greenwood Dr., Southbury, CT (US) 06488

( * ) Notice: Subject to any disclaimer, the term of this patent is extended or adjusted under 35 U.S.C. 154(b) by 0 days.

(21) Appl. No.: 11/248,898

(22) Filed: Oct. 11, 2005

Related U.S. Application Data

(63) Continuation of application No. 10/057,489, filed on Jan. 23, 2002, now Pat. No. 6,953,249.

(60) Provisional application No. 60/264,812, filed on Jan. 29, 2001.

(51) Int. Cl.
- G03H 1/00 (2006.01)
- G09G 5/00 (2006.01)
- G02F 1/00 (2006.01)
- H04N 5/74 (2006.01)
- H04N 5/262 (2006.01)
- G02B 27/14 (2006.01)
- G03B 13/00 (2006.01)

(52) U.S. Cl. .............. 353/38; 353/30; 345/7; 348/756; 348/758; 348/345; 348/333.01; 348/240.2; 359/630; 359/637

(58) Field of Classification Search .......... 353/30, 353/38; 345/7, 9; 348/756, 758, 345, 333.01, 348/240.2; 359/618, 629, 630, 637
See application file for complete search history.

(56) References Cited

U.S. PATENT DOCUMENTS

| | | | |
|---|---|---|---|
| 2,955,156 A | 10/1960 | Heilig | |
| 3,507,988 A | 4/1970 | Holmes | |
| 3,542,457 A | 11/1970 | Balding et al. | |
| 4,028,725 A | 6/1977 | Lewis | |
| 4,072,971 A | 2/1978 | Kuboshima | |
| 4,189,744 A | 2/1980 | Stern | |
| 4,199,785 A | 4/1980 | McCullough et al. | |
| 4,513,317 A | 4/1985 | Ruoff, Jr. | |
| 4,618,231 A | 10/1986 | Genco et al. | |
| 4,672,438 A | 6/1987 | Plante et al. | |
| 4,757,380 A | 7/1988 | Smets et al. | |
| 4,828,381 A | 5/1989 | Shindo | |
| 5,103,306 A | 4/1992 | Weiman et al. | |
| 5,175,616 A | 12/1992 | Milgram et al. | |
| 5,245,371 A | 9/1993 | Nagano et al. | |
| 5,252,950 A | 10/1993 | Saunders et al. | |
| 5,262,807 A | 11/1993 | Shindo | |
| 5,291,234 A | 3/1994 | Shindo et al. | |
| 5,296,888 A | 3/1994 | Yamada | |

(Continued)

FOREIGN PATENT DOCUMENTS

EP 0 350 957 A2 1/1990

(Continued)

OTHER PUBLICATIONS

Yamaguchi et al, "Proposal for a Large Visual Field Display Employing Eye Movement Tracking," SPIE Proceedings, vol. 1194, Nov. 8-10, 1989.

(Continued)

Primary Examiner—W. B. Perkey
Assistant Examiner—Magda Cruz

(57) ABSTRACT

Light (22) is projected from an image projector (20), in response to an image information signal (18) and is controllably refracted in response to a first control signal (26), for projecting refracted light (27) onto a screen (28). The screened light is for providing viewable images of varying size occupying all or part of the screen. The viewable images are refracted in response to a second control signal (64) for viewing the images of increasingly smaller size with correspondingly increasing magnification.

17 Claims, 4 Drawing Sheets

U.S. PATENT DOCUMENTS

| | | | |
|---|---|---|---|
| 5,341,181 A | 8/1994 | Godard | |
| 5,363,241 A | 11/1994 | Hegg et al. | |
| 5,365,370 A | 11/1994 | Hudgins | |
| 5,374,820 A | 12/1994 | Haaksman | |
| 5,422,653 A | 6/1995 | Maguire, Jr. | |
| 5,422,700 A | 6/1995 | Suda et al. | |
| 5,448,411 A | 9/1995 | Morooka | |
| 5,455,654 A | 10/1995 | Suzuki | |
| 5,467,104 A | 11/1995 | Furness, III et al. | |
| 5,499,138 A * | 3/1996 | Iba | 359/569 |
| 5,515,130 A | 5/1996 | Tsukahara et al. | |
| 5,526,082 A | 6/1996 | Hirano | |
| 5,534,918 A | 7/1996 | Torii et al. | |
| 5,543,887 A | 8/1996 | Akashi | |
| 5,546,224 A | 8/1996 | Yokota | |
| 5,563,670 A | 10/1996 | Tenmyo | |
| 5,579,165 A | 11/1996 | Michel et al. | |
| 5,583,795 A | 12/1996 | Smyth | |
| 5,589,908 A | 12/1996 | Irie | |
| 5,625,765 A | 4/1997 | Ellenby et al. | |
| 5,635,947 A | 6/1997 | Iwamoto | |
| 5,644,324 A | 7/1997 | Maguire, Jr. | |
| 5,715,384 A | 2/1998 | Oshima et al. | |
| 5,734,421 A | 3/1998 | Maguire, Jr. | |
| 5,737,012 A | 4/1998 | Tabata et al. | |
| 5,857,121 A | 1/1999 | Arai et al. | |
| 5,909,240 A | 6/1999 | Hori | |
| 5,973,845 A | 10/1999 | Hildebrand et al. | |
| 5,978,015 A | 11/1999 | Ishibashi et al. | |
| 6,061,103 A * | 5/2000 | Okamura et al. | 348/767 |
| 6,078,349 A | 6/2000 | Molloy | |
| 6,084,557 A | 7/2000 | Ishida et al. | |
| 6,094,182 A * | 7/2000 | Maguire, Jr. | 345/9 |
| 6,133,941 A | 10/2000 | Ono | |
| 6,134,048 A | 10/2000 | Kato et al. | |
| 6,177,952 B1 | 1/2001 | Tabata et al. | |
| 6,181,371 B1 | 1/2001 | Maguire, Jr. | |
| 6,215,532 B1 | 4/2001 | Takagi et al. | |
| 6,246,382 B1 * | 6/2001 | Maguire, Jr. | 345/8 |
| 6,246,437 B1 | 6/2001 | Kaneda | |
| 6,252,989 B1 | 6/2001 | Geisler et al. | |
| 6,271,895 B1 | 8/2001 | Takagi et al. | |
| 6,281,862 B1 | 8/2001 | Tidwell et al. | |
| 6,307,589 B1 * | 10/2001 | Maquire, Jr. | 348/333.03 |
| 6,359,601 B1 * | 3/2002 | Maguire, Jr. | 345/7 |
| 6,388,707 B1 | 5/2002 | Suda | |
| 6,393,056 B1 | 5/2002 | Talluri et al. | |
| 6,407,724 B1 * | 6/2002 | Waldern et al. | 345/8 |
| 6,414,709 B1 | 7/2002 | Palm et al. | |
| 6,417,867 B1 | 7/2002 | Hallberg | |
| 6,445,365 B1 | 9/2002 | Taniguchi et al. | |
| 6,449,309 B1 | 9/2002 | Tabata | |
| 6,469,683 B1 | 10/2002 | Suyama et al. | |
| 6,478,425 B1 | 11/2002 | Trajkovic et al. | |
| 6,504,535 B1 | 1/2003 | Edmark | |
| 6,507,359 B1 | 1/2003 | Muramoto et al. | |
| 6,512,892 B1 | 1/2003 | Montgomery et al. | |
| 6,546,208 B1 | 4/2003 | Costales | |
| 6,558,050 B1 | 5/2003 | Ishibashi | |
| 6,568,809 B1 | 5/2003 | Trajkovic et al. | |
| 6,580,448 B1 | 6/2003 | Stuttler | |
| 6,580,563 B1 | 6/2003 | Finney | |
| 6,603,443 B1 | 8/2003 | Hildebrand et al. | |
| 6,614,426 B1 | 9/2003 | Kakeya | |
| 6,714,174 B1 | 3/2004 | Suyama et al. | |
| 6,741,250 B1 | 5/2004 | Furlan et al. | |
| 6,762,794 B1 | 7/2004 | Ogino | |
| 6,778,150 B1 * | 8/2004 | Maguire, Jr. | 345/7 |
| 6,953,249 B1 * | 10/2005 | Maguire, Jr. | 353/30 |
| 6,972,733 B1 * | 12/2005 | Maguire, Jr. | 345/7 |
| 2001/0043163 A1 | 11/2001 | Waldern et al. | |
| 2002/0064314 A1 | 5/2002 | Comaniciu et al. | |
| 2002/0109701 A1 | 8/2002 | Deering | |
| 2002/0158888 A1 | 10/2002 | Kitsutaka | |
| 2003/0197933 A1 | 10/2003 | Sudo et al. | |
| 2004/0108971 A1 | 6/2004 | Waldern et al. | |
| 2004/0150728 A1 | 8/2004 | Ogino | |

FOREIGN PATENT DOCUMENTS

| | | |
|---|---|---|
| EP | 0 655 640 A1 | 5/1995 |
| EP | 1 083 454 A2 | 3/2001 |
| GB | 2 226 923 A | 7/1990 |
| GB | 2 272 124 A | 5/1994 |
| JP | 3-292093 | 12/1991 |
| WO | WO 99/30508 | 6/1999 |
| WO | WO 00/51345 A1 | 8/2000 |
| WO | WO 01/95016 A1 | 12/2001 |
| WO | WO 03/079272 A1 | 9/2003 |

OTHER PUBLICATIONS

Geisler et al, "A Real-Time Foveated Multiresolution System for Low-Bandwidth Video Communication," SPIE Proceedings, vol. 3299, 1998.

Klarquist et al, "FOVEA, A Foveated Vergent Active Stereo System for Dynamic Three-Dimensional Scene Recovery," IEEE Proceedings 1998.

Zha et al, "Dynamic Gaze-Controlled Levels of Detail of Polygonal Objects in 3-D Environment Modeling," 3-D Digital Imaging & Modeling, 1999; Proceedings, 1999.

* cited by examiner

METHOD AND DEVICES FOR DISPLAYING IMAGES FOR VIEWING WITH VARYING ACCOMMODATION

CROSS-REFERENCE TO RELATED APPLICATIONS

This application is a continuation of U.S. patent application Ser. No. 10/057,489 filed on Jan. 23, 2002 now U.S. Pat. No. 6,953,249 and claims priority from U.S. Provisional Application No. 60/264,812 filed Jan. 29, 2001.

BACKGROUND OF INVENTION

1. Technical Field

The present invention relates to acquiring images and, more particularity, to displaying such images for viewing with varying accommodation.

2. Discussion of Related Art

The granularity of a given static man-made image of a real object is only as good as that of the imaging technology used to acquire and present it. Closer inspection with a magnifying glass or other aid to eyesight does not ultimately reveal any deeper granularity but only the limitations of the imaging technology used. This is not usually a problem for the enjoyment of images in books, movies, and other conventional media On the other hand, the granularity of real objects is unlimited as far as the human eye is concerned. Considering the eye itself, with increased focus, more detailed granularity of objects is always revealed. Moreover, with technological aids to the eye, e.g., the magnifying glass, the optical microscope, the electron microscope and other scientific tools, smaller details are always revealed.

A recent motion picture or video innovation provides successive images to the eye at varying apparent distances for viewing with correspondingly varying focus (accommodation) of the eye. With increased magnification merely at the viewer's end, however, because of the limitations of man-made imaging technology, there is not any increased level of granularity available for inspection. If the magnification is also increased at the camera end there will be increased granularity but the viewer with increased accommodation will focus on only a small part of the entire field-of-view presented. The effect is reduced granularity. Therefore, the verisimilitude of the imagery under increased magnification is a problem.

SUMMARY OF INVENTION

An object of the present invention is to provide images of objects in a scene at varying distances that provide increased granularity to close-ups.

According to a first aspect of the present invention, a method is provided comprising the steps of projecting light from an image projector, in response to an image information signal, controllably refracting said projected light, in response to a first control signal, for projecting refracted light for providing viewable images of varying extent, and controllably refracting said viewable images in response to a second control signal for viewing said images of increasingly smaller extent with correspondingly increasing magnification.

According to a second aspect of the present invention, a device is provided, comprising a projector, responsive to an image information signal, for providing first light rays, a first optic, responsive to the first light rays and to a first control signal, for providing second light rays, a screen, responsive to the second light rays, for providing third light rays indicative of images of varying size, and a second optic, responsive to the third light rays and to a second control signal, for providing fourth light rays for viewing.

According to a third aspect of the invention, a device is provided, comprising an image projector for projecting light in response to an image information signal, a first optic for controllably refracting said projected light, in response to a first control signal, for providing light rays of varying extent, and a second optic for controllably refracting said light rays in response to a second control signal for providing light rays of increasingly smaller extent at correspondingly decreasing focal length.

These and other objects, features, and advantages of the present invention will become more apparent in light of a detailed description of a best mode embodiment thereof which follows, as illustrated in the accompanying drawing.

DETAILED DESCRIPTION OF PREFERRED EMBODIMENTS

Figure 1:
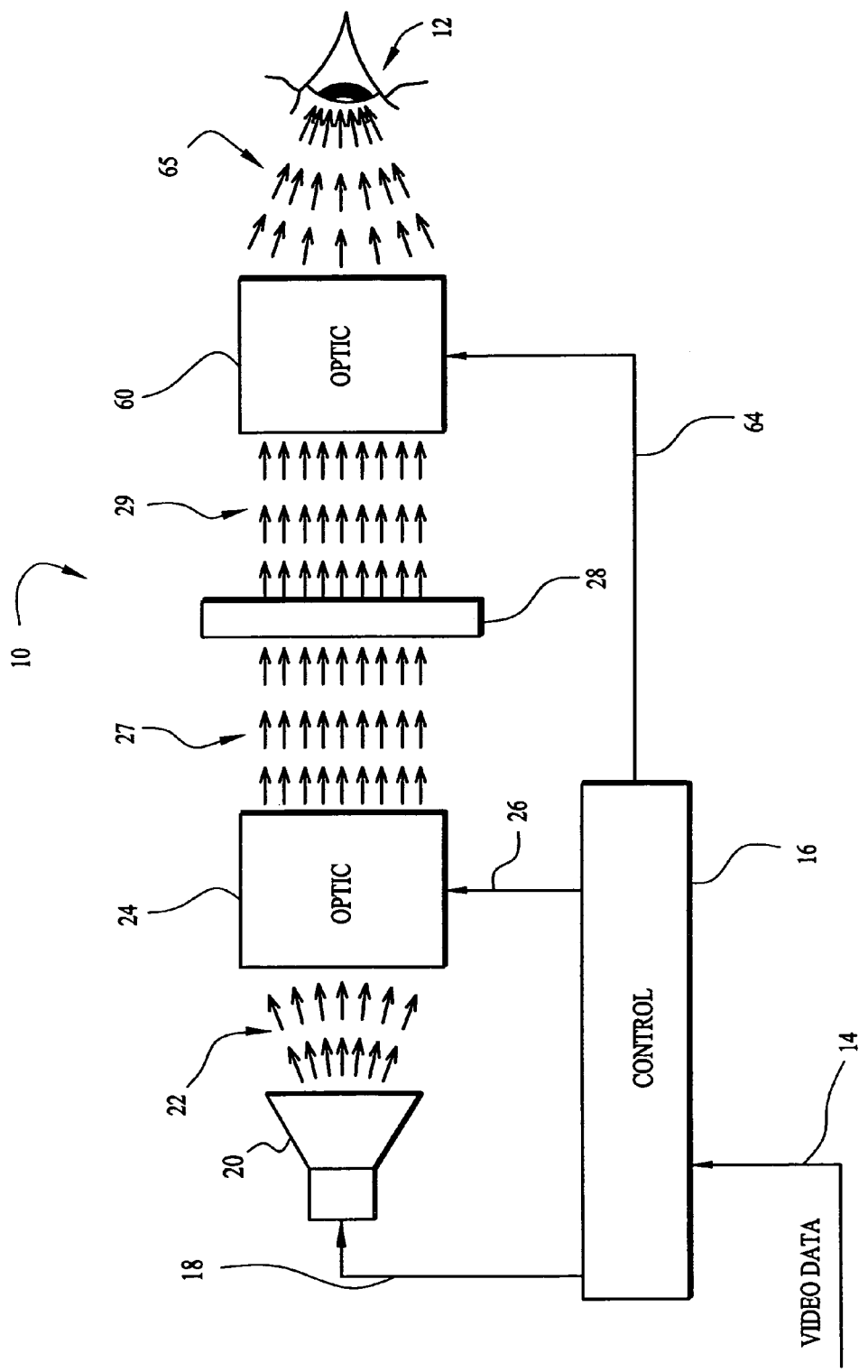
FIG. 1 shows a system including a device for showing images to an eye of a user.
Figure 3:
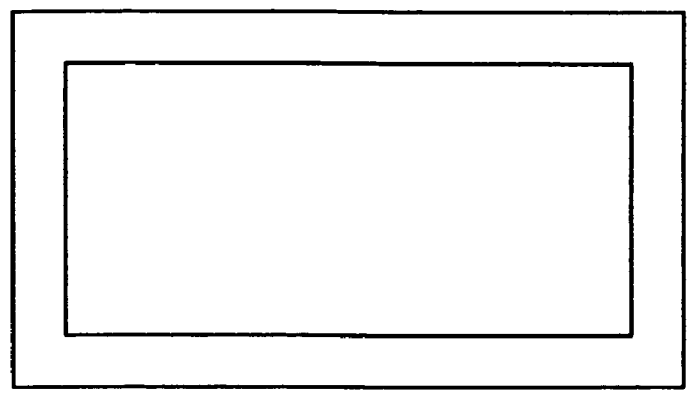
FIG. 3 shows light rays projected to form an image that fills or almost fill the entire area or extent of a screen.
Figure 4:
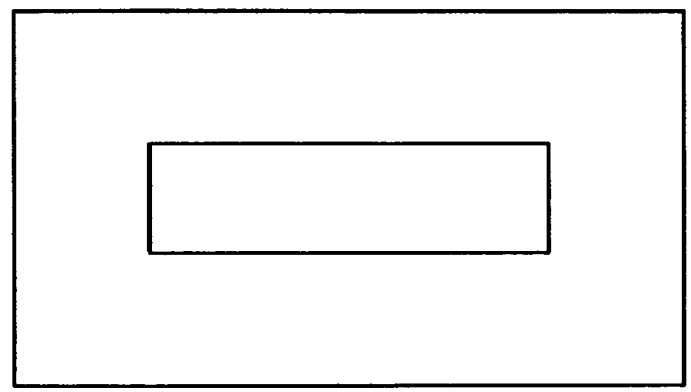
FIG. 4 shows light rays projected to form an image that only partially fills the entire extent of the screen.
Figure 5:
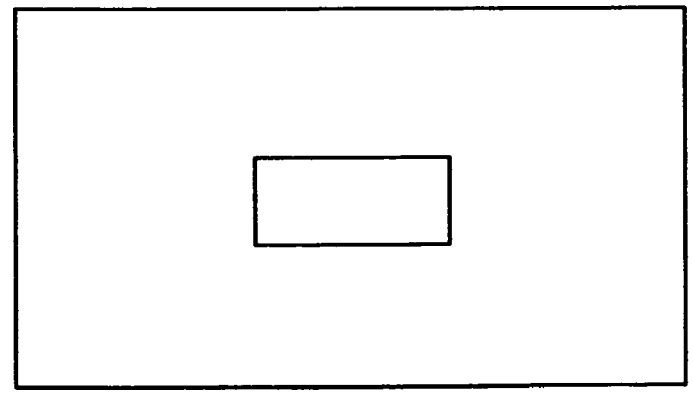
FIG. 5 shows light rays projected to form an image that only fills a small extent of the entire extent of the screen.

FIG. 1 shows a device 10 for showing images to an eye 12 of a user. A video signal is received on a line 14 by a control 16. The video signal contains image information which is decoded and provided on a signal line 18 to for instance an image projector 20 which projects images with first light rays 22 to a first optic 24. The optic 24 may for instance be lens that is under the control of a control signal on a line 26 from the control 16. The control signal on the line 26 is decoded by the control 16 from the video signal on the line 14. The optic 24 refracts or otherwise bends the light rays 22 into second light rays 27 that are projected onto a translucent screen 28 to form images of different sizes, i.e., that fill the screen 28 to a greater or lesser extent as shown in FIGS. 3–5, as discussed below. The images on the screen 28 are projected as third light rays 29. It should be realized that the screen need not be translucent but could be reflective. The signal on the line 14 can be provided in many different ways. It should first of all be realized that the signal on the line 14 need not be a single line (which implies some form of multiplexing) but could be two or more signal lines.

Figure 2:
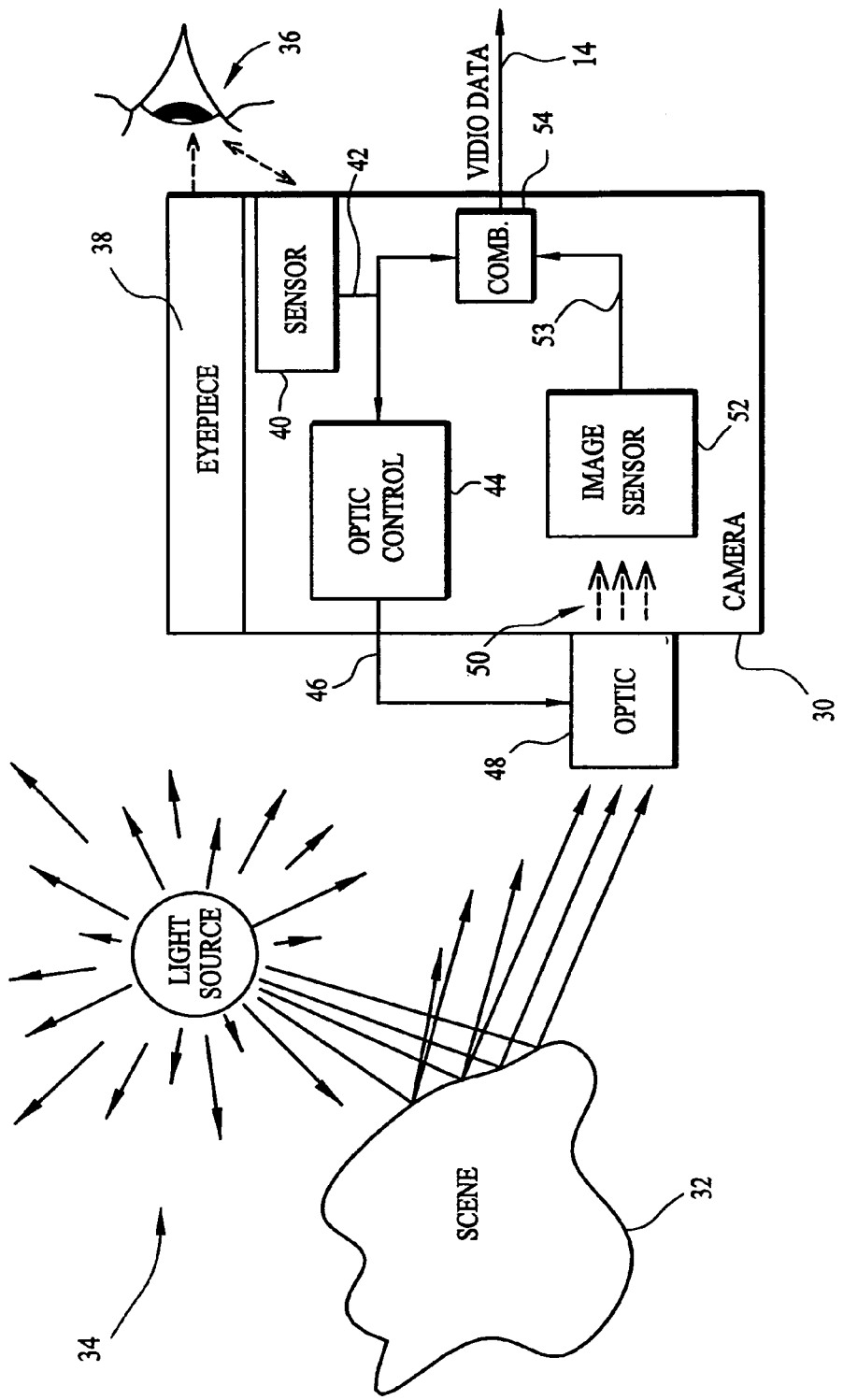
FIG. 2 shows a video camera collecting images of a scene illuminated by a light source with an eye of a cameraman shown using an eyepiece to view the scene being photographed and having a sensed eye signal encoded along with video information.

Secondly, as a first example of a way to provide the signal on the line 14, referring to FIG. 2, a video camera 30 is shown collecting images of a scene 32 illuminated by a light source 34. An eye 36 of a cameraman is shown using an eyepiece 38 for viewing the scene being photographed. A sensor 40 such as an eye accommodation sensor senses the accommodation of the eye 36. The sensor 40 provides a sensed signal on a line 42 to an optic control 44. The optic control 44 provides a camera optic control signal on a signal line 46 to a motorized camera optic 48. The optic control 44 causes the motorized optic 48 to focus on the scene 32 at differing focal lengths according to changes in the accommodation of the eye 36 as detected by the sensor 40. The optic 48 casts rays 50 onto an image sensor 52 that provides a video image signal on a line 53 to a combiner 54. It combines, e.g., in a time division multiplexed way, the image signal on the line 53 with the signal on the line 42 to form the video data signal on the line 14 (see FIG. 1). As explained above, the signal on the line 42 could be provided in parallel on a separate signal line alongside the signal on the line 14. In that case, it would only carry video information.

Referring now back to FIG. 1, it will be realized from the foregoing that the control signal on the line 26 changes the projected light rays 22 by means of the optic 24 according to changes detected in the cameraman's eye 36 of FIG. 2 by the sensor 40. In other words, the signal on the line 42 from the sensor 40 is not only used to control the optic 48, but is encoded in the signal on the line 14 along with the image information and used also to control the optic 24. The nature of the change in the projected light rays 22 is manifested by the manner in which the light rays 27 are projected onto the screen 28. Examples are shown in FIGS. 3–5. If the eye 36 of FIG. 2 is detected by the sensor 40 viewing the scene 32 with a long focal distance, such as infinity, the optic control 44 causes the optic 48 to focus at a correspondingly long distance. The optic 48 focuses the scene 32 at infinity and projects the details of the scene with a wide field of view onto the image sensor 52. Consequently, the available sensor 52 pixels are spread over a relatively wide field of view. In other words, the granularity of the image is spread over a wide field of view. FIG. 3 shows the light rays 27 projected to form an image 54 that fills or almost fills the entire area or extent of the screen 28.

If the eye 36 of FIG. 2 is detected by the sensor 40 viewing the scene 32 with an intermediate focal distance, the optic control 44 causes the optic 48 to focus at a correspondingly intermediate distance. The optic 48 focuses the scene 32 at the intermediate distance and projects the details of the scene with an intermediate field of view onto the image sensor 52. Consequently, the granularity, i.e., the available sensor pixels are spread over a relatively intermediate field of view that is less in extent than the relatively wide field-of-view 54 of FIG. 3. FIG. 4 shows the light rays 27 projected to: form an image 56 that only partially fills the entire extent of the screen 28.

If the eye 36 of FIG. 2 is detected by the sensor 40 viewing the scene 32 with a short focal distance, the optic control 44 causes the optic 48 to focus at a correspondingly short distance. The optic 48 focuses the scene 32 at a correspondingly short distance and projects the details of the scene with a narrow field of view onto the image sensor 52. FIG. 5 shows the light rays 27 projected to form an image 58 that only fills a small extent of the entire extent of the screen 28. Consequently, the available sensor pixels are spread over a relatively narrow field of view 58 that is less in extent than the intermediate field of view 56 of FIG. 4. Particular objects within the narrowed field of view 58 of FIG. 5 can be viewed with more granularity than those same objects could be with the granularity provided by that of FIG. 4 and even more so than that of FIG. 3.

Referring back to FIG. 1, as explained above, the light rays 27 are projected onto the screen 28 with different fields-of-view, areas or extents 54, 56, 58, all of which have the same total number of pixels. The advantage of this approach is that with the aid of an optic 60, the field of view of the eye 12 of the viewer can be fully occupied with all of these pixels even though the accommodation of the eye 12 changes. The total number of pixels can be spread over the full used extent of the retina in all cases by a combination of changes in the focal length of the optic 60 and the accommodation of the eye 12. When the optic 48 of the camera 30 of FIG. 2 focuses in on a detail of the wider scene 32, it increases the granularity of the imaged scene in that area. At the same time, the optic 24 causes the size of the image to be reduced on the screen 28. In other words, when the focal length of the optic 48 is shortened to capture a narrowed field of view of the scene with increased magnification, the granularity of that smaller portion of the imaged scene increases as manifested in a smaller area on the screen 28. The focal length of the optic 60 is controlled by a control signal on a line 64 from the control 16 to allow the eye 12 to accommodate, i.e., to focus closer onto the scene with increased granularity in a smaller area of interest. In other words, at the same time that the control signal on the line 26 causes the optic 24 to reduce the extent to which the screen 28 is filled by imagery (see FIG. 4), the signal on the line 64 causes the optic 60 to reduce the field of view provided for the eye 12, e.g., by increasing its magnification. Thus, the optic 60 refracts the rays 29 to provide fourth light rays 65 in such a way that the eye 12 must change its accommodation so as to bring the image into focus. This causes the field of view of the eye 12 to be fully occupied with an up-close image.

If the cameraman's eye 36 changes to a long view of the scene 32, as explained above, the image 54 (FIG. 3) fills the screen 28 because the control signal on the line 26 causes the optic 24 to expand the extent to which the screen 28 is filled by imagery. At the same time, the signal on the line 64 causes the optic 60 to expand the field of view provided for the eye 12, e.g., by reducing its magnification or increasing its focal length. The eye 12 changes its accommodation accordingly. In other words, when the control signal on the line 26 causes the optic 24 to increase the extent to which the screen 28 is filled by imagery, as in FIG. 3, the signal on the line 64 causes the optic 60 to increase the field of view provided for the eye 12 even further, e.g., by decreasing its magnification even more.

Figure 6:
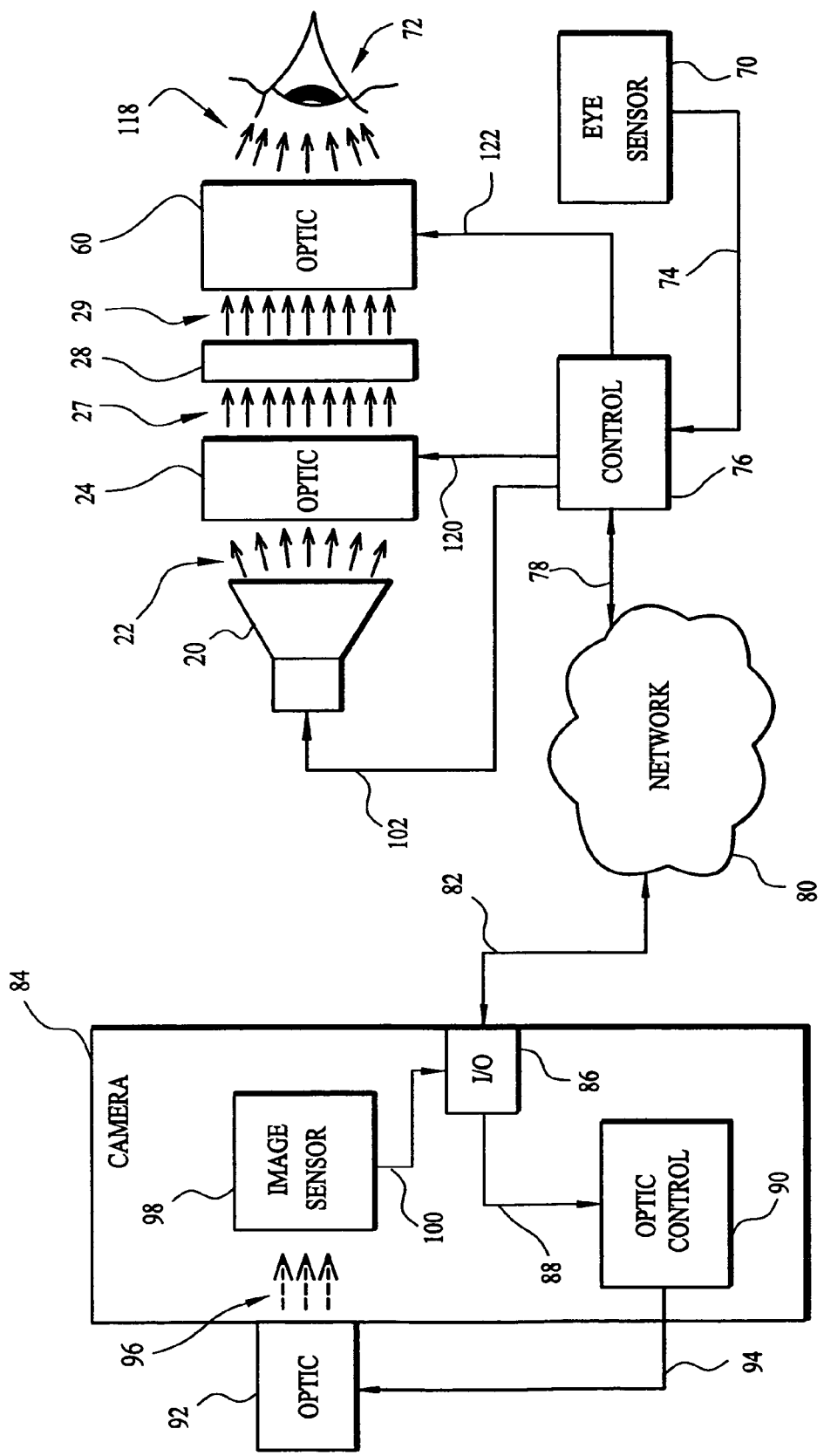
FIG. 6 is similar to FIG. 1, except the control signal is sensed not from the eye of the cameraman, but from the eye of the user.

FIG. 6 shows a variation of FIG. 1 where instead of sensing the cameraman's eye, the eye of the user is sensed. As shown, an eye sensor 70 senses an eye of a user, for instance by sensing accommodation. A control signal having a magnitude indicative thereof is provided on a line 74 to a control 76 which provides it on a line 78 to a network 80. The network provides the control signal on a line 82 to a camera 84. An input/output device 86 is responsive to the control signal on the line 82 and provides it on a line 88 to an optic control 90 which controls a lens 92 by means of a signal on a line 94. In this way, the camera's magnification is controlled remotely by the user's eye 72 instead of locally by a cameraman's eye.

At the same time, light rays 96 focused by the lens 92 and cast upon an image sensor 98 are converted to an electrical signal on a line 100 and provided to the input/output means 86 for transmission on the line 82 via the network and the line 78 to the control 76. An image signal is provided on a line 102 to a projector 20 for projecting light rays 22 to an optic 24 for projection as rays 27 onto a translucent screen 28. A backlit image formed on the screen 28 provides light rays 29 to an optic 60 that projects rays 118 to the eye 72 of the user. Besides controlling the lens 92, the signal on the line 74 is used by the controller 76 to provide optic control signals on lines 120, 122 for controlling the optics 108, 116 in providing images with differing field of view at different sizes as shown in FIGS. 3–5.

It should be realized that the sensed property of the user's eye need not be accommodation. For instance, eye direction could be sensed. Moreover, it should also be realized that the control signal need not be derived from a sensed eye at all. It could be provided for instance by a mouse or other control device employed by the user, by the cameraman, by a director, or by someone else to control magnification of the imagery. Likewise, the imagery need not be obtained from a camera, but could be generated from a computer or a drawing, painting, or hand-drawn animation. Although a real image is shown projected onto a screen, the optics 108, 116 could be arranged to present a virtual image to the eye of the user without any intermediate screen. It should also be realized that the imagery could be provided as stereoscopic images

The invention claimed is:

1. Apparatus for collecting video images of a scene illuminated by a light source, comprising:
    an optic control, responsive to a sensed eye signal indicative of changes in a sensed eye, for providing a camera optic control signal;
    a camera optic, responsive to the camera optic control signal, for focusing on the scene at differing focal lengths according to the changes in the sensed eye so as to project light with details of said scene over a widest field of view when focusing at infinity and over correspondingly narrower fields of view when focusing at various distances closer than infinity;
    an image sensor with available pixels for sensing said scene, responsive to light projected from said camera optic with details of said scene over said widest field of view and over said correspondingly narrower fields of view spread over the available pixels, for providing a video image signal; and
    a combiner, responsive to said video image signal and to said sensed eye signal for providing a video data signal with said video images collected by said apparatus formed for display with a largest size corresponding to said widest field of view and with decreasing sizes corresponding to increasingly narrower fields of view and with said sensed eye signal formed for control of said video images for said display such that particular objects in said scene are viewable with increasing granularity with decreasing focal length.

2. The apparatus of claim 1, further comprising an eye sensor for sensing an eye of a user of the apparatus and for providing said sensed eye signal.

3. The apparatus of claim 2, wherein said eye sensor is for sensing accommodation of said eye of said user.

4. The apparatus of claim 2, wherein said eye sensor is for sensing said eye of said user while said user is viewing objects in said scene and while said apparatus is collecting images of said objects in said scene.

5. The apparatus of claim 1, further comprising:
    a control, responsive to said video data signal, for providing an image information signal, a first control signal, and a second control signal;
    an image projector for projecting light in response to said image information signal;
    a first optic for controllably refracting said projected light in response to said first control signal, for providing light rays of varying extent; and
    a second optic for controllably refracting said light rays in response to a second control signal for providing light rays for forming said video images with increasingly smaller extent at correspondingly decreasing focal length.

6. The apparatus of claim 5, wherein said video data signal is transmitted over a network.

7. The apparatus of claim 5, wherein said eye sensor is for sensing an eye of a user viewing said video images.

8. The apparatus of claim 7, wherein said video data signal is transmitted over a network.

9. The apparatus of claim 7, wherein said eye sensor is for sensing accommodation of said eye of said user viewing said video images.

10. The apparatus of claim 9, wherein said video data signal is transmitted over a network.

11. The apparatus of claim 1, further comprising:
    a control, responsive to said video data signal, for providing an image information signal, a first control signal, and a second control signal;
    a projector, responsive to said image information signal, for providing first light rays;
    a first optic, responsive to the first light rays and to said first control signal, for providing second light rays;
    a screen, responsive to the second light rays, for providing third light rays indicative of images of varying size; and
    a second optic, responsive to the third light rays and to said second control signal, for providing fourth light rays as said video images for viewing.

12. The apparatus of claim 11, wherein said video data signal is transmitted over a network.

13. The apparatus of claim 11, wherein said eye sensor is for sensing an eye of a user viewing said video images.

14. The apparatus of claim 13, wherein said eye sensor is for sensing accommodation of said eye of said user viewing said video images.

15. The apparatus of claim 13, wherein said video data signal is transmitted over a network.

16. The apparatus of claim 13, wherein said eye sensor is for sensing accommodation of said eye of said user viewing said video images.

17. The apparatus of claim 16, wherein said video data signal is transmitted over a network.

* * * * *